United States Patent [19]

Clegg

[11] Patent Number: 4,602,616
[45] Date of Patent: Jul. 29, 1986

[54] CONICAL DIFFUSED-SUNLIGHT SOLAR PANEL

[76] Inventor: John E. Clegg, 2320 Keystone Dr., Orlando, Fla. 32806

[21] Appl. No.: 762,896

[22] Filed: Aug. 6, 1985

[51] Int. Cl.[4] ............................................... F24J 3/02
[52] U.S. Cl. ................................... 126/440; 428/431; 428/443; 428/434
[58] Field of Search ............... 126/450, 431, 440, 439, 126/443, 428, 434

[56] References Cited

U.S. PATENT DOCUMENTS

| | | | |
|---|---|---|---|
| 583,580 | 6/1897 | Pennycuick | 126/440 |
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 126/438 X |
| 4,329,021 | 5/1982 | Bennett et al. | 350/259 |
| 4,333,713 | 6/1982 | Clegg | 350/432 |

Primary Examiner—Larry Jones
Assistant Examiner—Carl D. Price

[57] ABSTRACT

An annular convex-concave lens mounted near the periphery of the circular roof of a circular building, a circular conical beam concentrator mounted below the roof at the center of the building, and a vertical metal heat duct mounted inside the beam concentrator. The annular lens receives and refracts a convergent conical incipient beam of diffused sunlight, forming a concentrated convergent lateral beam in the horizontal plane. The convergent lateral beam is projected inward to the beam concentrater which refracts the beam twice more and emits a thin convergent lateral beam onto the heat duct. The heat absorbed by the heat duct is distributed by air flowing through the duct to other parts of the building.

1 Claim, 7 Drawing Figures

CONICAL DIFFUSED-SUNLIGHT SOLAR PANEL

BACKGROUND

The code designation of the conical lenses of the solar panel is 3RT:C (R—refracting section (face) of a component lens, T—transmitting section of a component lens, and C—concentrating stage lens). The panel has three conical lenses which receive and transmit incident beams without refraction and which emit the beams with refraction, producing concentrated beams.

Prior art includes three conical lenses which receive annular incipient beams and emit concentrated circular whole beams (U.S. Pat. Nos. 2,881,654 and 2,882,784 by Toffolo; and U.S. Pat. No. 4,325,612 by Clegg) and four conical lenses which receive whole incipient beams and emit concentrated circular whole beams (U.S. Pat. Nos. 4,277,148; 4,333,713; 4,492,438; and 4,521,085 by Clegg). None of these lenses is equipped to receive convergent conical beams of diffused sunlight, this being a distinctive feature of the disclosure.

Concurrent art includes three conical lenses by this inventor which receive convergent conical beams of diffused sunlight; *Conical Beam Concentrator* RT:C, U.S. Pat. No. 4,575,196, dated Mar. 11, 1986; *Conical Beam Concentrator* RT:C, Ser. No. 651,015, filed Sept. 17, 1984; and *Conical Beam Concentrator Heater,* RT:C, Ser. No. 641,274, filed Aug. 16, 1984. The concept of using diffused sunlight as a source of solar energy will be introduced to the public with the issue and publication of these patents.

The subject disclosure is similar to the three above concentrators in that it too receives diffused sunlight; it differs from the above concentrators in that it produces a concentrated convergent lateral beam in the horizontal plane rather than a concentrated beam parallel to the vertical optic axis of the lenses.

Concurrent art also includes the *Circular Conical Beam Concentrator* 2RT:C, Ser. No. 654,297, filed Sept. 25, 1986, by this inventor. This concentrator has an outer annular component lens with a cylindrical section which receives a convergent lateral beam and an inner annular component lens with a concave conical section which emits a concentrated convergent lateral beam. This concentrator is identical to the one featured in the subject disclosure.

DRAWINGS

DESCRIPTION

Figure 1:
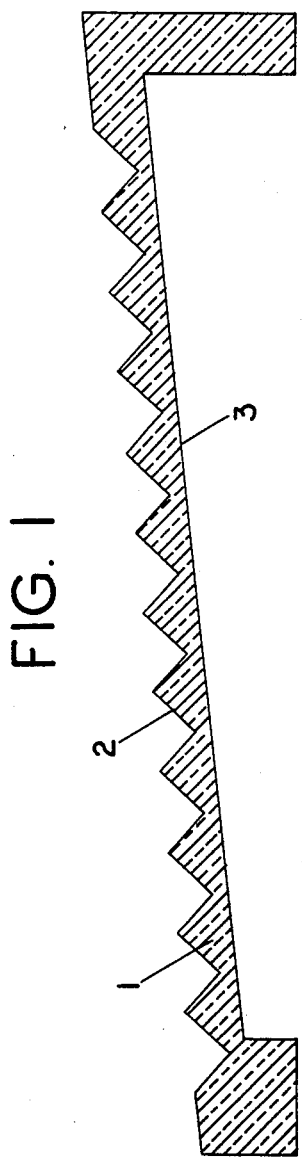
FIG. 1 is an elevation of the annular convex-concave lens shown in section.
Figure 5:
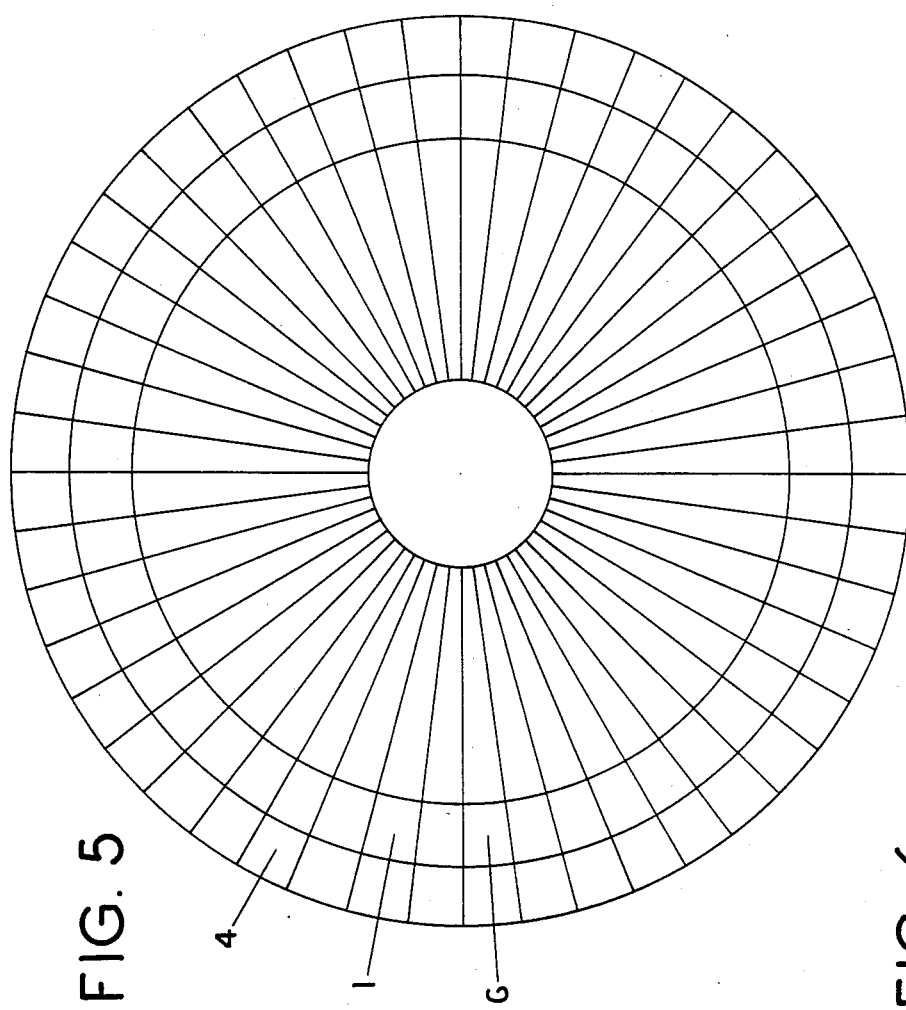
FIG. 5 is a plan view of the circular roof of the building showing the windows above the annular convex-concave lens encircling the roof.
Figure 7:
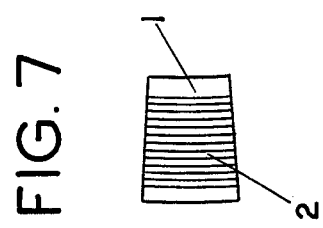
FIG. 7 is a plan view of the annular convex-concave lens.

FIG. 1 is an elevation of the annular lens 1 having twelve inset convex conical sections 2 and a concave conical section 3. FIG. 7 is a plan view of the annular lens 1, and FIG. 5 is a plan view of a circular roof 4 of a circular building 5 with forty eight sections of annular lens 1 mounted below circular windows 6 located around the periphery of roof 4.

Figure 2:
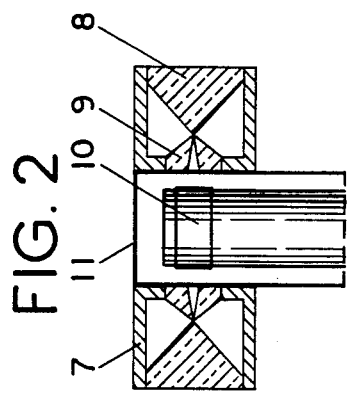
FIG. 2 is an elevation of the conical beam concentrator shown in section with the heat duct mounted therein.
Figure 6:
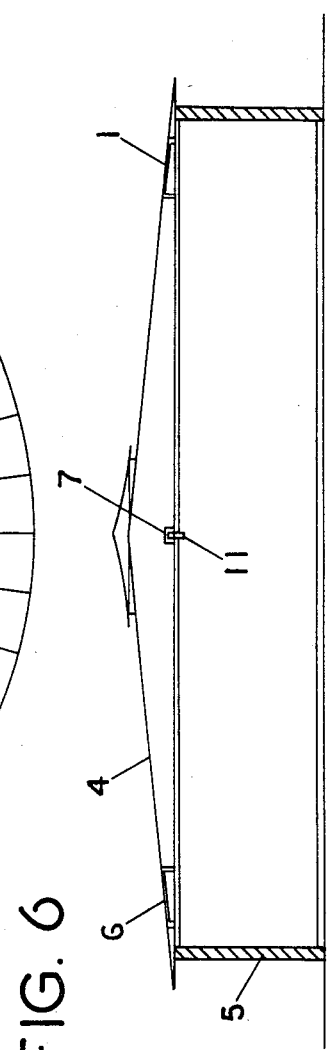
FIG. 6 is an elevation of the circular building.

FIG. 2 is an elevation of the circular conical beam concentrator 7 mounted below roof 4 in the center of the building (FIG. 6). Beam concentrator 7 has an annular outer component lens 8 and an inner component lens 9. Metal heat duct 10 is mounted inside the beam concentrator 7 and enclosed at the sides and top by glass heat duct 11. Heat ducts 10 and 11 are cylindrical.

Figure 4:
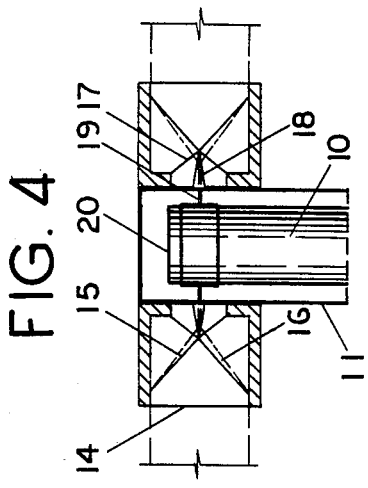
FIG. 4 is an elevation of the conical beam concentrator and heat duct with a ray diagram.
Figure 3:
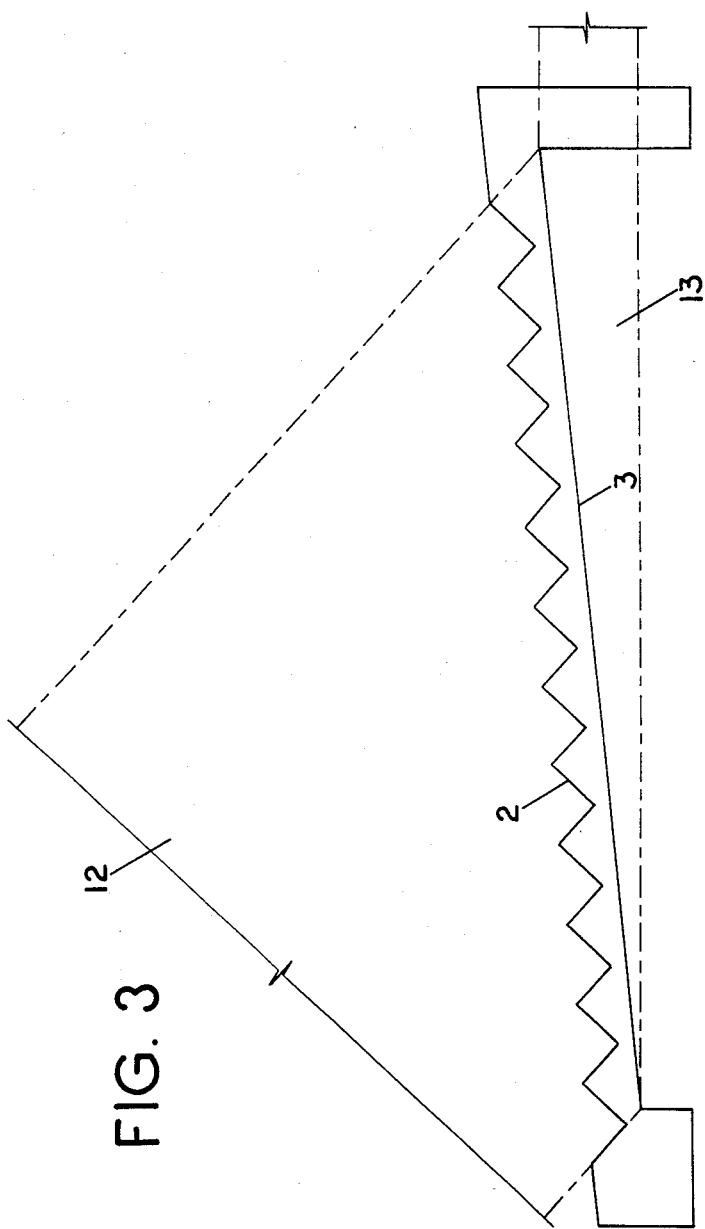
FIG. 3 is an elevation of the annular convex-concave lens with a ray diagram.

FIGS. 3 and 4 are elevations of the annular lens 1 and beam concentrator 7 with ray diagrams. Diffused sunlight 12 is transmitted by twelve inset convex conical sections 2 and refracted by concave conical section 3, forming concentrated convergent lateral beam 13.

Beam 13 is projected inward to circular conical beam concentrator 7, transmitted by cylindrical section 14 and refracted by two opposed concave conical sections 15, forming concentrated convergent conical beams 16.

Beams 16 are transmitted by two opposed convex conical sections 17 and refracted by two opposed concave conical sections 18, forming concentrated convergent lateral beam 19 which is projected through glass heat duct 11 onto metal heat duct 10.

Metal heat duct 10 is open at the top 20. Air circulates upward between metal heat duct 10 and glass heat duct 11, enters metal heat duct 10 through top 20 and descends into the room below through a vertical heat duct (not shown).

The heat content of diffused sunlight is very low. This means that an extremely large area of diffused sunlight must be received and reduced in size to produce a small concentrated beam with an intensity high enough to provide sustained heat to the heating element throughout the hours of daylight. The diffused-sunlight solar panel achieves the desired results by producing four reductions in beam size as shown in the table below:

| Beam | Incident bm. area - cm² | Means of reduction | Reduced bm. area - cm² |
| --- | --- | --- | --- |
| Diffused sunlight 12 | 318,500 | Refraction | 45,000 |
| Conv. lat. bm. 13 | 45,000 | Convergence | 972 |
| Conv. lat. bm. 13 | 972 | Refraction | 39 |
| Conv. con. bms. 16 | 39 | Refraction | 9 |

I claim:

1. A conical diffused-sunlight solar panel comprising in general an annular lens mounted below roof windows in the peripheral area of a circular roof of a circular building, a circular conical beam concentrator mounted below the roof in the center of the building, a glass heat duct mounted inside the beam concentrator, and a metal heat duct mounted inside the glass heat duct; and comprising in particular;

an annular lens having twelve inset convex conical sections which receive diffused sunlight, said annular lens having a concave conical section which refracts and emits said diffused sunlight to form a first concentrated convergent lateral beam which is projected inward to the center of the building parallel to a horizontal plane;

a circular conical beam concentrator having an outer component lens and an inner component lens, said outer component lens having a cylindrical section which receives and transmits said first convergent lateral beam, said outer component lens having two opposed concave conical sections which refract and emit said first convergent lateral beam to form two concentrated convergent conical beams, said inner component lens having two opposed convex conical sections which receive and transmit said two convergent conical beams, said inner component lens having two opposed concave conical sections which refract and emit said two convergent conical beams to form a second concentrated convergent lateral beam which is projected inward to the center of the building parallel to said horizontal plane;

a vertical cylindrical glass heat duct occupying a central axis of the building, having an open bottom and a closed top, and mounted inside said circular conical beam concentrator so as to receive and transmit said second convergent lateral beam; and a vertical cylindrical metal heat duct having an open bottom and an open top, said metal heat duct mounted inside said glass heat duct so as to intercept said second convergent lateral beam and absorb the heat thereof.

* * * * *